United States Patent
Lahnala

[19]

[11] Patent Number: 5,997,793
[45] Date of Patent: Dec. 7, 1999

[54] ENCAPSULATED WINDOW ASSEMBLY INCLUDING AN IN-MOLDED PERIPHERY SEAL

[75] Inventor: David W. Lahnala, Adrian, Mich.

[73] Assignee: Libbey-Owens-Ford Co., Toledo, Ohio

[21] Appl. No.: 09/002,805

[22] Filed: Jan. 5, 1998

Related U.S. Application Data

[60] Provisional application No. 60/035,365, Jan. 10, 1997.

[51] Int. Cl.⁶ .................................................. B29C 39/10
[52] U.S. Cl. .......................... 264/261; 264/252; 264/275
[58] Field of Search ..................................... 264/261, 252, 264/275, 278, 271.1

[56] References Cited

U.S. PATENT DOCUMENTS

| | | | |
|---|---|---|---|
| 3,037,810 | 6/1962 | Kelley | 264/261 |
| 3,744,201 | 7/1973 | Dochnahl . | |
| 4,834,931 | 5/1989 | Weaver | 264/261 |
| 5,069,852 | 12/1991 | Leone et al. | 264/252 |
| 5,209,019 | 5/1993 | Morita . | |
| 5,344,603 | 9/1994 | Jardin et al. | 264/261 |

*Primary Examiner*—Mathieu D. Vargot
*Attorney, Agent, or Firm*—Marshall & Melhorn

[57] ABSTRACT

A process for forming an encapsulated window assembly including a gasket member surrounding a peripheral region of a transparent sheet and a peripheral seal secured to the gasket member. The peripheral region of the transparent sheet, as well as a preformed periphery seal assembly, are positioned within a mold cavity. The periphery seal assembly includes an elastomeric seal secured to a seal support member, with the seal support member being relatively rigid as compared with the elastomeric seal. The mold is closed, bring the mold sections into facing relationship, whereby opposed surfaces of the seal support member of the periphery seal assembly are engaged between a surface of the first mold section and a surface of the second mold section. A molding material is injected into the mold so as to fill the mold cavity, is allowed to solidify, and the mold is opened and the encapsulated window assembly is removed. The invention also relates to the resulting encapsulated glazing unit and mold apparatus.

6 Claims, 2 Drawing Sheets

ENCAPSULATED WINDOW ASSEMBLY INCLUDING AN IN-MOLDED PERIPHERY SEAL

RELATED APPLICATION

This application is claiming the benefit, under 35 USC §119(e), of the provisional application filed Jan. 10, 1997, under 35 USC § 111(b), which was granted a Ser. No. of 60/035,365. The provisional application, Ser. No. 60/035, 365, is hereby incorporated by reference.

BACKGROUND OF THE INVENTION

1. Field of the Invention

The present invention relates generally to encapsulated window assemblies comprising a polymeric frame or gasket member surrounding peripheral regions of a glass sheet and, in particular, to encapsulated window assemblies such as vehicle roof panels including a preformed, molded-in-place periphery seal. The invention also relates to the mold and process used in forming such window assemblies.

2. Related Art

Initially, fixed window assemblies for vehicles were comprised of a plurality of elements including adhesive elements applied around the marginal edges of the glass sheet, suitable mechanical fasteners such as metal clips, and exterior decorative trim strips disposed to cover the marginal edges of the glass sheet and the adjacent portions of the vehicle frame. Such window structures were costly, especially from a labor standpoint, since it was necessary to assemble the individual elements along the vehicle assembly line.

Subsequently, in an endeavor to improve the above window structure, unitary window assemblies of the type illustrated in U.S. Pat. No. 4,072,340 were developed. These assemblies included a sheet of glass, an adjacent frame, and a casing or gasket of molded material, such as poly(vinyl chloride), extending between the frame and peripheral edge of the window to hold the sheet of glass and the frame together. Fasteners were provided at spaced locations along the frame such that the entire assembly could be guided into location over the opening in a vehicle body as a unit. Other types of unitary window assemblies are disclosed in U.S. Pat. Nos. 3,759,004 and 4,364,595. While such unitary window structures gradually reduced the time required to mount the window assembly in the associated vehicle, such structures were relatively costly, since the individual components required to produce each window unit generally required manually assembly.

In a further development, single sheets of glass and laminated glass assemblies were formed with integral frame or gasket members molded by a reaction injection molding (RIM) process. U.S. Pat. No. 4,561,625 is illustrative of such a process and resulting product, and is incorporated herein by reference. Such an assembly can be readily attached to the material defining the periphery of a window opening, for example, during the manufacturing of a vehicle. Typically, the frame or gasket member is formed of a polyurethane material.

In the case of certain moveable window assemblies, such as vehicle roof panels, elastomeric periphery seals have been used to insure a watertight seal between the window assembly and the window opening. Where such periphery seals have been used, they have typically been secured to the gasket member of the window assembly following the molding process, using either double-sided adhesive materials or "snap-fit" type mechanical interlocking means. Both of these methods require relatively expensive post-molding, labor intensive procedures, may result in gaps between the periphery seal and the gasket member and therefore an incomplete seal, and are prone to the eventual separation of the periphery seal from the gasket member.

It has recently been proposed to provide a periphery seal which is molded in place to the gasket member. Such a periphery seal is illustrated, for example, in U.S. Pat. No. 5,344,603. This patent describes a process for producing a window assembly with a peripheral seal for vehicle roofs in which a glass sheet 10, a support member 12 and a profile part 13 are inserted in a mold, the profile part 13 being positioned by upper and lower attaching projections 6 and 7. An elastomeric material 9 is then introduced into the mold. A seal 16 may be molded directly on the profile part 13 prior to the injection molding of the elastomer 9.

Despite the above-described improvements in encapsulated window assemblies, a further improved process and mold for use in forming such window assemblies is desired.

SUMMARY OF THE INVENTION

This invention is directed to a process for forming an encapsulated window assembly comprising a gasket member surrounding a peripheral region of a transparent sheet and a peripheral seal secured to the gasket member. According to the invention, a mold is provided having cooperating first and second mold sections defining a mold cavity. The peripheral region of the transparent sheet, as well as a preformed periphery seal assembly, are positioned within the mold cavity. The periphery seal assembly includes an elastomeric seal secured to a seal support member, with the seal support member being relatively rigid as compared with the elastomeric seal.

The mold is closed, bring the mold sections into facing relationship, whereby opposed surfaces of the seal support member of the periphery seal assembly are engaged between a surface of the first mold section and a surface of the second mold section. Then, a molding material is injected into the mold so as to fill the mold cavity, thereby forming the gasket member. The molding material flows about the peripheral region of the transparent sheet and the seal support member of the periphery seal assembly. A suitable time is allowed to pass to allow the molding material to solidify, and the mold is opened and the encapsulated window assembly is removed therefrom.

The process of the invention may advantageously be employed to provide an encapsulated glazing unit comprising a transparent sheet of frangible material, a polymeric gasket molded and cured in situ around at least a portion of the peripheral margin of the transparent sheet, and a periphery seal assembly molded and fused in situ to the gasket simultaneously with the molding and curing thereof. The periphery seal assembly includes an elastomeric seal secured to a seal support member, with the seal support member being relatively rigid as compared with the elastomeric seal. Furthermore, in a preferred embodiment, a top surface of the seal support member and an adjacent top surface of the elastomeric seal are substantially coplanar with a major surface of the sheet of frangible material, there being substantially no gap between the respective top surfaces of the seal support member and elastomeric seal.

BRIEF DESCRIPTION OF THE DRAWINGS

The advantages of the invention will become readily apparent to those skilled in the art from the following detailed description of a preferred embodiment when considered in the light of the accompanying drawings, in which.

DESCRIPTION OF THE PREFERRED EMBODIMENTS

Figure 1:
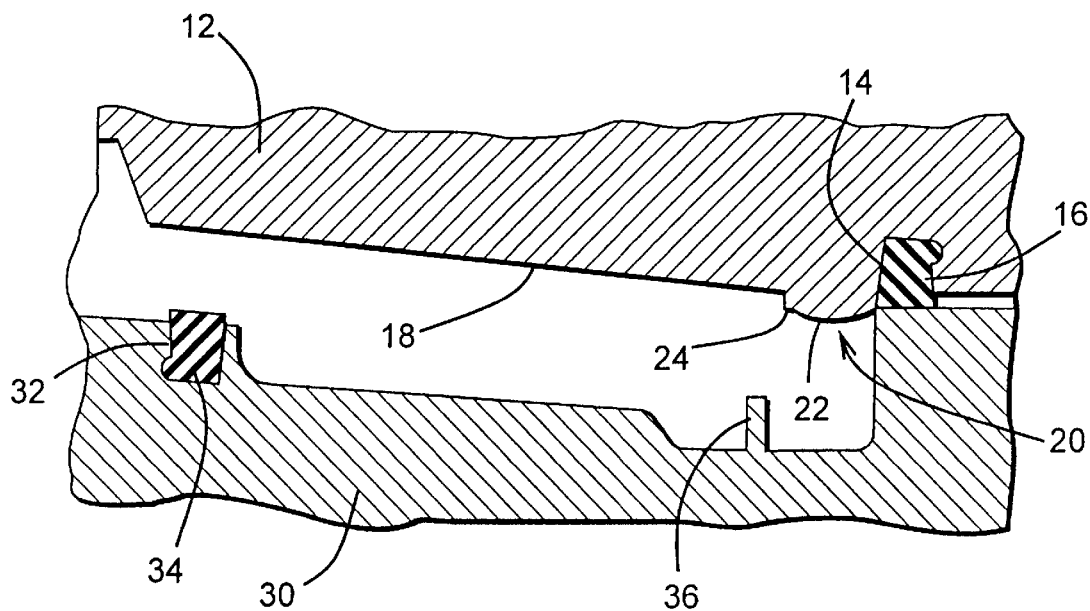
FIG. 1 is an enlarged, fragmentary sectional view of a mold, in the closed condition, used to form a window assembly in accordance with the invention.

Referring now to the drawings, there is illustrated in FIG. 1 a mold 10, including cooperating upper and lower mold sections, for forming a window assembly in accordance with the invention. The upper mold section 12 typically includes a groove 14 in which an upper mold seal 16 is positioned. The seal 16 may be formed of a silicon rubber material and can be secured within the groove 14 by means of a suitable adhesive. Alternatively, the seal 16 can be secured within the groove 15 by mechanical means, such as by providing the seal 16 and groove 14 with spaced-apart tabbed portions and corresponding tab receiving means (not shown).

Figure 2:
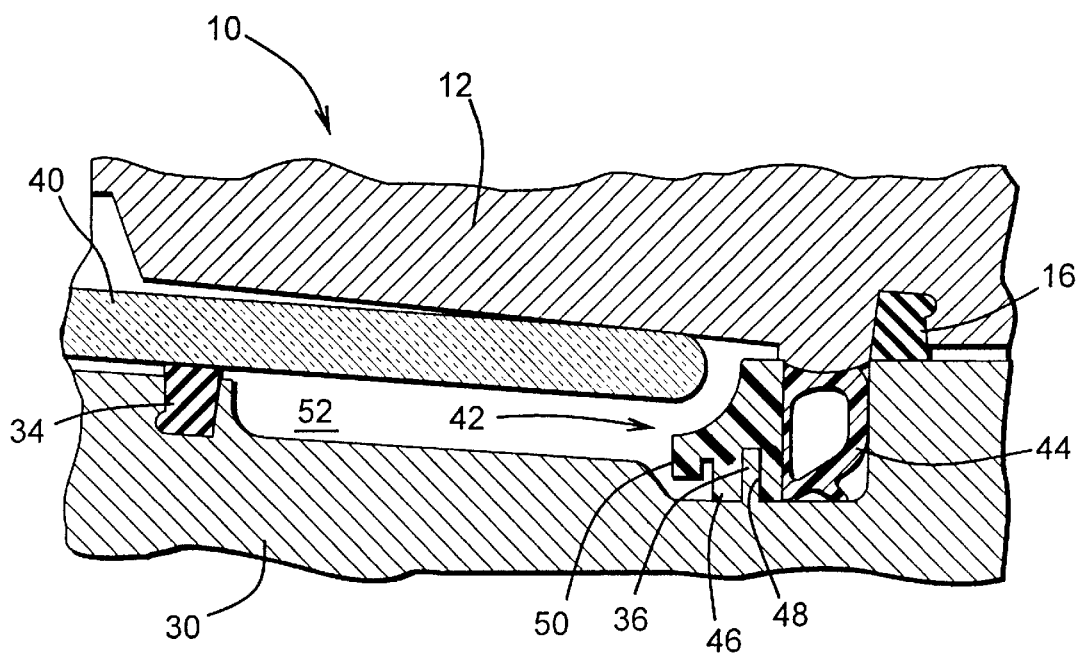
FIG. 2 is an enlarged, fragmentary sectional view of the mold of FIG. 1 with a glass sheet and a preformed periphery seal positioned therein.

The upper mold section 12 is preferably formed with a tapered portion 18 which angles downward toward the lower mold section in such a manner that the lower surface of the upper mold half 12 will contact the glass sheet only near its peripheral edge, as illustrated in FIG. 2. In an alternate embodiment, an additional seal (not shown) could be provided in a corresponding groove in the upper mold section 12 such that said seal was in contact with the upper surface of the glass sheet, and contact between the mold sections and the glass sheet is avoided. In a preferred embodiment, the upper mold section 12 is also provided with a downwardly extending sealing projection 20 which contacts the periphery seal during the molded process. As described in greater detail below, the sealing projection 20 includes a protruding main portion 22 and a lip portion 24.

The mold 10 also includes a lower mold section 30 which cooperates with the upper mold section 12. The lower mold section 30 includes a groove 32 in which a lower mold seal 34 is positioned. The seal 34 may be formed of a silicon rubber material and can be secured within the groove 32 by means of a suitable adhesive or by mechanical means, as discussed above.

The lower mold section 30 is further provided with a positioning structure, such as projection 36, for positioning a periphery seal assembly in the lower mold half relative to the glass sheet. The projection 36 is shaped to mate with a corresponding recess formed in a portion of the periphery seal assembly, as shown in FIG. 2. As will be appreciated, in an alternate embodiment a recess could be formed on the lower mold section 30 with a corresponding projection formed on the periphery seal assembly, or a combination of complementary projections and recesses could be provided respectively on the mold section 30 and seal assembly.

While the mold sections 12 and 30 are typically formed, for example, of a metallic material such as steel or aluminum, other types of substantially non-resilient materials can be used. Suitable means (not shown) are conventionally provided to open and close the mold sections 12 and 30. In addition, each of the mold sections 12 and 30 can be provided with passageways (not shown) for circulating a suitable coolant therethrough.

The mold sections 12 and 30 cooperate to define a chamber for receiving a sheet 40 of transparent material, such as glass, on which a gasket member is to be formed. Referring to FIG. 2, a glass sheet 40 is positioned so that an outer peripheral portion of the lower surface thereof rests on the lower mold seal 34. The glass sheet 40 is initially formed into the desired shape to conform, for example, with the sheet metal of the vehicle into which the window assembly is to be installed.

In accordance with the invention, a periphery seal assembly 42 is also positioned on the lower mold section 30. The periphery seal assembly 42 of the invention more particularly includes an elastomeric seal 44 and a seal support member 46. In the final window assembly of the invention, it is the seal 44 which provides the watertight contact with the window opening (not shown). The seal support member 46 secures the elastomeric seal 44 to the molded gasket member of the window assembly.

The seal support member 46 includes a depression or recess 48 which is complementary to the projection 36 formed in the lower mold section 30. As a result, the entire periphery seal assembly 42 may be readily positioned within the mold 10 by mating the projection 36 with the complementary depression 48. The seal support member 46 is further provided with an irregular inwardly facing portion, such as the generally L-shaped extension 50 shown in FIGS. 2, 3 and 5. The cooperation of the extension 50 with the molded gasket member provides a more secure mechanical attachment between the periphery seal assembly 42 and the gasket member.

The periphery seal can be formed with a single-piece construction of a material having a Shore A hardness of at least about 50. However, in a preferred embodiment, the seal 44 and seal support member 46 are separate pieces which are then securely attached together by suitable means. In a most preferred embodiment, the periphery seal assembly 42 is formed by co-extruding a material and thereby integrally bonding the support member 46 with the elastomeric seal 44. Alternatively, the periphery seal assembly 42 may be formed by bonding the support member 46 to the seal 44 with a suitable adhesive material, by providing mechanical interlocking means therebetween, or by other known methods.

The seal support member 46 of the periphery seal assembly 42 is formed of a material which exhibits sufficient dimensional stability to withstand the compressive pressures or forces exerted by the mold 10 and the injection process utilized. Where the seal 44 and support member 46 are formed of separate materials, as is preferred, the support member 46 is preferably formed of a material which exhibits a Shore A hardness of at least about 90. The seal 44 of the periphery seal assembly 42, on the other hand, is formed of a flexible material exhibiting a hardness which is less than that of the support member 46. Preferably, the seal 44 is formed of a material exhibiting a Shore A hardness of between about 40 and 50. In a preferred embodiment, the seal 44 and support member 46 are both formed of two different blends of a thermoplastic rubber with poly(vinyl chloride).

To form the window assembly of the invention, the glass sheet 40 is suitably positioned on the lower mold seal 34. The periphery seal assembly 42 is also positioned on the lower mold section 30, with the depression 48 mating with the complementary projection 36 in the lower mold section 30. The upper mold section 12 is then lowered into position, as illustrated in FIG. 2. In this position, the upper mold seal 16 contacts the upper surface of the lower mold section 30. In addition, the projection 20 of the upper mold section 12 contacts the periphery seal assembly 42. More particularly, the protruding main portion 22 of the projection 20 contacts the seal 44, so that the seal 44 is compressed between the projection 20 and the upper surface of the lower mold section 30. In addition, the lip portion 24 of the projection 20 is maintained in sealing engagement with an upper edge of the support member 46 of the periphery seal assembly 42. The lip portion 24 preferably contacts only as much of the upper edge of the support member 46 as is necessary to provide a sufficient sealing engagement therebetween. In this manner, there will be little or no gap between the respective upper surfaces of the support member 46 and seal 44 in the finished window assembly.

Figure 3:
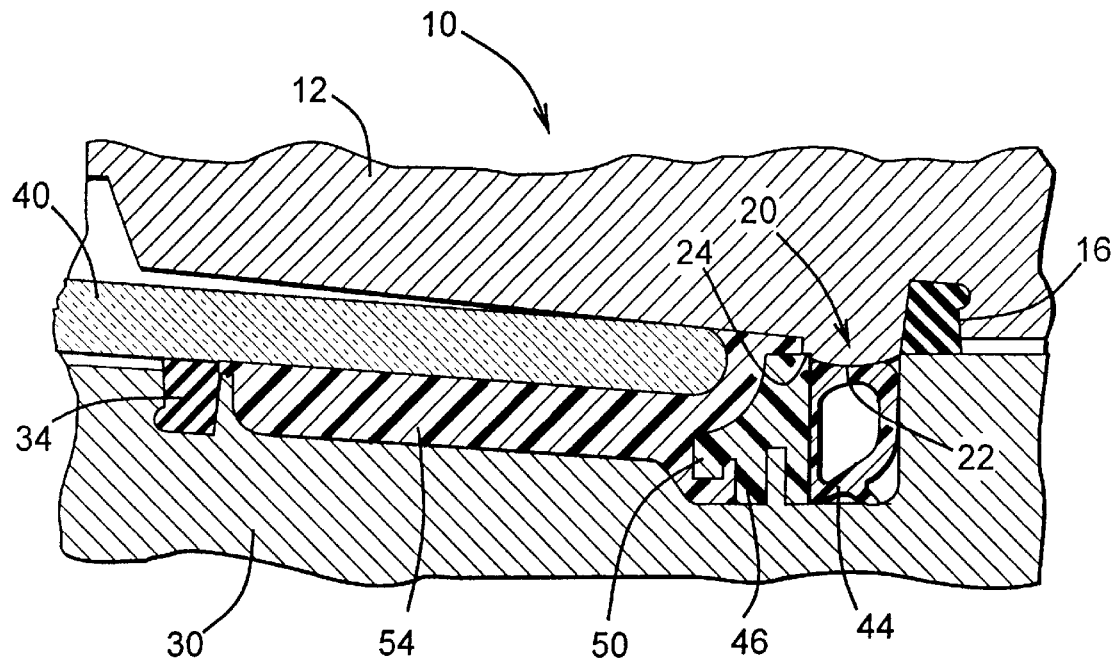
FIG. 3 is an enlarged, fragmentary sectional view of the mold of FIG. 2 after formation of the gasket member.

With the mold 10 in the closed condition, a cavity 52 is formed by the surfaces of the glass sheet 40, the lower mold seal 34, the upper surface of the lower mold section 30, the support member 46, and the lower surface of the upper mold section 12, including the lip portion 24 of the projection 20. Referring now to FIG. 3, a suitable polymeric material is introduced into the cavity 52, either in a standard injection molding process or in a reaction injection molding (RIM) process. The injected polymeric material flows throughout the cavity 52, including into any recess formed by the extension 50 on the support member 46, to form the gasket member 54 of the window assembly.

Figure 4:
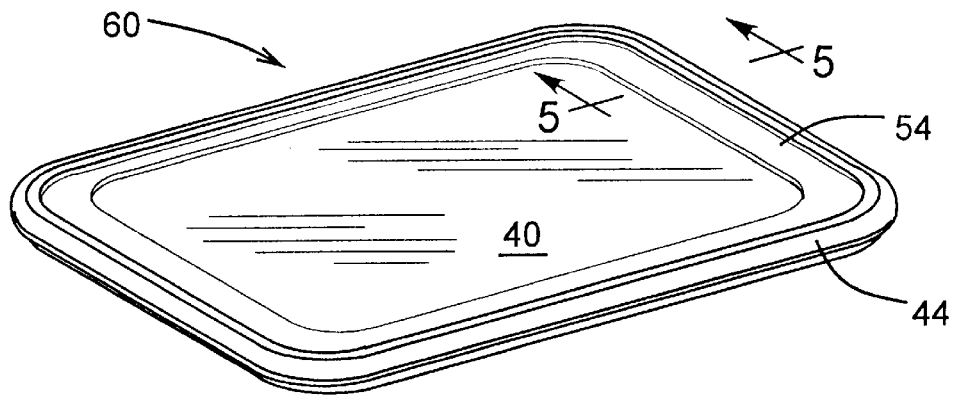
FIG. 4 is a perspective view of the molded window assembly formed in accordance with the invention following removal from the mold shown in FIGS. 1–3.
Figure 5:
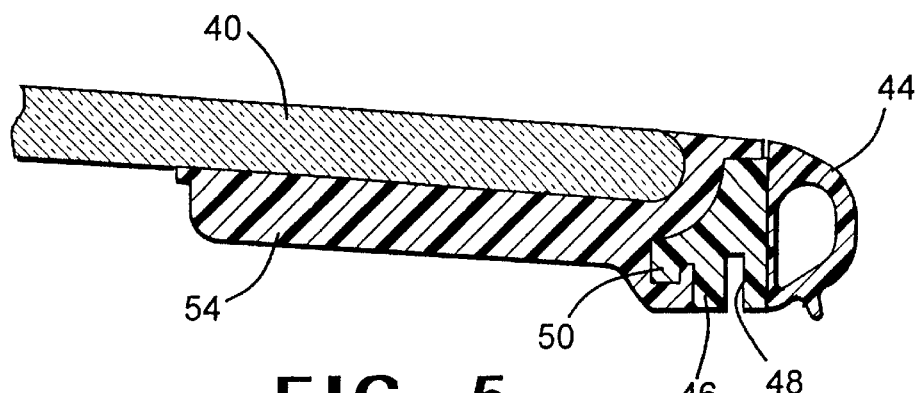
FIG. 5 is an enlarged, fragmentary sectional view of the window assembly taken along the lines 5—5 of FIG. 4.

The finished window assembly 60 is shown in FIGS. 4 and 5 after removal from the mold 10. In the illustrated embodiment, the window assembly 60 is formed as a vehicle roof panel, with the gasket member 54 and periphery seal 42 extending about the entire periphery of the glass sheet 40. The window assembly 60 includes the glass sheet 40, the molded gasket member 54, and the periphery seal assembly 42. As illustrated in FIG. 5, upon removal from the mold 10, the seal 44 returns to its pre-molded position, leaving little or no gap between the respective upper surfaces of seal 44 and the support member 46.

In accordance with the provisions of the patent statutes, the present invention has been described in what is considered to represent its preferred embodiment. However, it should be noted that the invention can be practiced otherwise than as specifically illustrated and described without departing from its spirit or scope.

For example, while the embodiments of the invention illustrated in the drawings and described herein concern a window assembly having a single sheet of glass, it will be appreciated that the invention can be readily incorporated in a window assembly consisting of a laminated composite employing two or more sheets of glass. Also, while the preferred embodiment of the invention is described as a vehicle roof panel, it will be appreciated that the assembly may also be advantageously employed as a vehicle window or as a window in a building structure. Further, it will be understood that the glass sheet material can also be replaced by plastic sheet material to evolve a product having many of the same inherent advantages.

What is claimed is:

1. A process for forming an encapsulated window assembly comprising a gasket member surrounding a peripheral region of a transparent sheet and a peripheral seal secured to said gasket member, comprising:

providing a mold having cooperating first and second mold sections defining a mold cavity;

placing the peripheral region of said transparent sheet within said mold cavity;

placing a preformed periphery seal assembly into said mold cavity, said periphery seal assembly including an elastomeric seal secured to a seal support member, said seal support member being relatively rigid as compared with said elastomeric seal;

closing the mold, whereby a lower surface and a spaced apart, opposed upper surface of the seal support member of said periphery seal assembly are engaged by a surface of said first mold section and a surface of said second mold section, respectively, the surfaces of said first and second mold sections thereby cooperating to exert a compressive force between said lower and upper surfaces of said seal support member;

injecting a molding material into said mold so as to fill said mold cavity, thereby forming said gasket member;

waiting a suitable time for said molding material to solidify; and opening said mold and removing said encapsulated window assembly.

2. A process as defined in claim 1, wherein said second mold section is provided with a projection which extends into said mold cavity and engages the seal support member of said periphery seal assembly when said mold is closed.

3. A process as defined in claim 2, wherein a portion of the projection extending from said second mold section engages and thereby compresses the elastomeric seal of said periphery seal assembly when said mold is closed.

4. A process as defined in claim 1, wherein said first mold section is provided with a projection for positioning said periphery seal assembly relative to said mold cavity, said projection on said first mold section mating with a corresponding recess formed in the support member of said periphery seal assembly.

5. A process as defined in claim 1, wherein said seal support member is further provided with an irregular inwardly facing portion which, when said periphery seal assembly is positioned in said first mold section, extends into said mold cavity and about which said molding material flows upon injecting the same into said mold, thereby mechanically securing the periphery seal assembly to the gasket formed by said molding material.

6. A process as defined in claim 1, further including the step of forming said periphery seal assembly by co-extruding a material and thereby integrally bonding the seal support member with the elastomeric seal, prior to placing the periphery seal assembly in the mold.

\* \* \* \* \*